US008743493B1

(12) United States Patent
Chang et al.

(10) Patent No.: US 8,743,493 B1
(45) Date of Patent: Jun. 3, 2014

(54) FIXED-POINT PROCESSING USING QUANTIZATION LEVELS BASED ON FLOATING-POINT PROCESSING

(71) Applicant: LSI Corporation, San Jose, CA (US)

(72) Inventors: Wu Chang, Sunnyvale, CA (US); Fan Zhang, Milpitas, CA (US); Ming Jin, Fremont, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/742,753

(22) Filed: Jan. 16, 2013

(51) Int. Cl.
*G11B 20/10* (2006.01)

(52) U.S. Cl.
USPC .......................................................... 360/39

(58) Field of Classification Search
None
See application file for complete search history.

(56) References Cited

U.S. PATENT DOCUMENTS

| 6,341,131 | B1 | 1/2002 | Eneroth et al. | |
|---|---|---|---|---|
| 7,263,539 | B2* | 8/2007 | Uchida | 708/204 |
| 7,432,925 | B2 | 10/2008 | D'Amora | |
| 8,166,363 | B2* | 4/2012 | Shinya et al. | 714/752 |
| 2006/0236195 | A1* | 10/2006 | Novichkov et al. | 714/758 |
| 2009/0161245 | A1* | 6/2009 | Mathew et al. | 360/65 |
| 2009/0327820 | A1* | 12/2009 | Asirvatham et al. | 708/204 |

OTHER PUBLICATIONS

S. Roy et al., "An Algorithm for Converting Floating-Point Computations to Fixed-Point in MATLAB Based FPGA Design," IEEE 41st Design Automation Conference (DAC), Jul. 2004, pp. 484-487.

Changchun Shi, "Statistical Method for Floating-Point to Fixed-Point Conversion," M.S. Thesis, Department of Electrical Engineering and Computer Science (EECS), University of California, 2002, 141 pages.
G. Masera et al., "Implementation of a Flexible LDPC Decoder," IEEE Transactions on Circuits and Systems II: Express Briefs, Jun. 2007, pp. 542-546, vol. 54, No. 6.
D. Menard et al., "Automatic Floating-Point to Fixed-Point Conversion for DSP Code Generation," International Conference on Compilers, Architecture, and Synthesis for Embedded Systems (CASES), Oct. 2002, pp. 270-276, Grenoble, France.
T. Bhatt et al., "Fixed Point DSP Implementation of Low-Density Parity Check Codes," Nov. 2007, 4 pages.
F. Leduc-Primeau et al., "A Relaxed Half-Stochastic Iterative Decoder for LDPC Codes," IEEE Global Telecommunications Conference (GLOBECOM), Nov.-Dec. 2009, 6 pages.
H. Wymeersch et al., "Log-Domain Decoding of LDPC Codes Over GF(q)," IEEE International Conference on Communications, Jun. 2004, pp. 772-776, vol. 2.
R. Yazdani et al., "Optimum Linear LLR Calculation for Iterative Decoding on Fading Channels," IEEE International Symposium on Information Theory, Jun. 2007, pp. 61-65.

(Continued)

*Primary Examiner* — Thang Tran
(74) *Attorney, Agent, or Firm* — Ryan, Mason & Lewis, LLP (57) ABSTRACT

An apparatus comprises read channel circuitry and signal processing circuitry associated with the read channel circuitry. The signal processing circuitry comprises a detector and a decoder coupled to the detector. The detector is configured to perform fixed-point detection on a digital data signal using a first set of quantization levels determined based at least in part on a result of a floating-point detection of the digital data signal. The decoder is configured to perform fixed-point decoding on an output of the detector using a second set of quantization levels determined based at least in part on a result of a floating-point decoding of the output of the detector.

20 Claims, 4 Drawing Sheets

(56) References Cited

OTHER PUBLICATIONS

A. Marinoni et al., "Non-Binary LDPC Codes with Good Performance on Channels Affected by Bursty Noise," Gruppo Nazionale Telecomunicazioni e Teoria dell'Informazione (GTTI) Annual Meeting, Jun. 2008, 8 pages, Florence, Italy.

H. Song et al., "Reduced-Complexity Decoding of Q-ary LDPC Codes for Magnetic Recording," IEEE Transactions on Magnetics, Mar. 2003, pp. 1081-1087, vol. 39, No. 2.

E, Sharon et al., "An Efficient Message-Passing Schedule for LDPC Decoding," 23rd IEEE Convention of Electrical and Electronics Engineers in Israel, Sep. 2004, pp. 223-226.

F. Kienle et al., "A Synthesizable IP Core for DVB-S2 LDPC Code Decoding," IEEE Proceedings of the Design, Automation and Test in Europe Conference and Exhibition (DATE), Mar. 2005, pp. 100-105, vol. 3.

* cited by examiner

FIXED-POINT PROCESSING USING QUANTIZATION LEVELS BASED ON FLOATING-POINT PROCESSING

FIELD

The field relates generally to signal processing, and, more particularly, to processing of digital data signals.

BACKGROUND

Disk-based storage devices such as hard disk drives (HDDs) are used to provide non-volatile data storage in a wide variety of different types of data processing systems. A typical HDD comprises a spindle which holds one or more flat circular storage disks, also referred to as platters. Each storage disk comprises a substrate made from a non-magnetic material, such as aluminum or glass, which is coated with one or more thin layers of magnetic material. In operation, data is read from and written to tracks of the storage disk via a read/write head that is moved precisely across the disk surface by a positioning arm as the disk spins at high speed.

SUMMARY

In one embodiment, an apparatus comprises read channel circuitry and signal processing circuitry associated with the read channel circuitry. The signal processing circuitry comprises a detector and a decoder coupled to the detector. The detector is configured to perform fixed-point detection on a digital data signal using a first set of quantization levels determined based at least in part on a result of a floating-point detection of the digital data signal. The decoder is configured to perform fixed-point decoding on an output of the detector using a second set of quantization levels determined based at least in part on a result of a floating-point decoding of the output of the detector.

Other embodiments of the invention include, by way of example and without limitation, methods, storage devices, virtual storage systems, integrated circuits and computer-readable storage media having computer program code embodied therein.

DETAILED DESCRIPTION

Embodiments of the invention will be illustrated herein in conjunction with exemplary disk-based storage devices, read channel circuitry and associated signal processing circuitry for processing read channel data signals. It should be understood, however, that these and other embodiments of the invention are more generally applicable to any storage device in which improved signal processing is desired. Additional embodiments may be implemented using components other than those specifically shown and described in conjunction with the illustrative embodiments.

The following acronyms are utilized in this description:

| | |
|---|---|
| ADC | Analog-to-Digital Converter |
| DFIR | Digital Finite Impulse Response |
| HDD | Hard Disk Drive |
| LDPC | Low-Density Parity-Check |
| LLR | Log Likelihood Ratio |
| MAP | Maximum a Posteriori Probability |
| NPFIR | Noise Predictive Finite Impulse Response |
| NRZ | Non-return to Zero |
| RAID | Redundant Array of Independent Storage Devices |
| RPM | Revolutions Per Minute |
| RS | Reed Solomon |
| SFR | Sector Failure Rate |
| SNR | Signal-to-Noise Ratio |
| SOYA | Soft-output Viterbi Algorithm |

Figure 1:
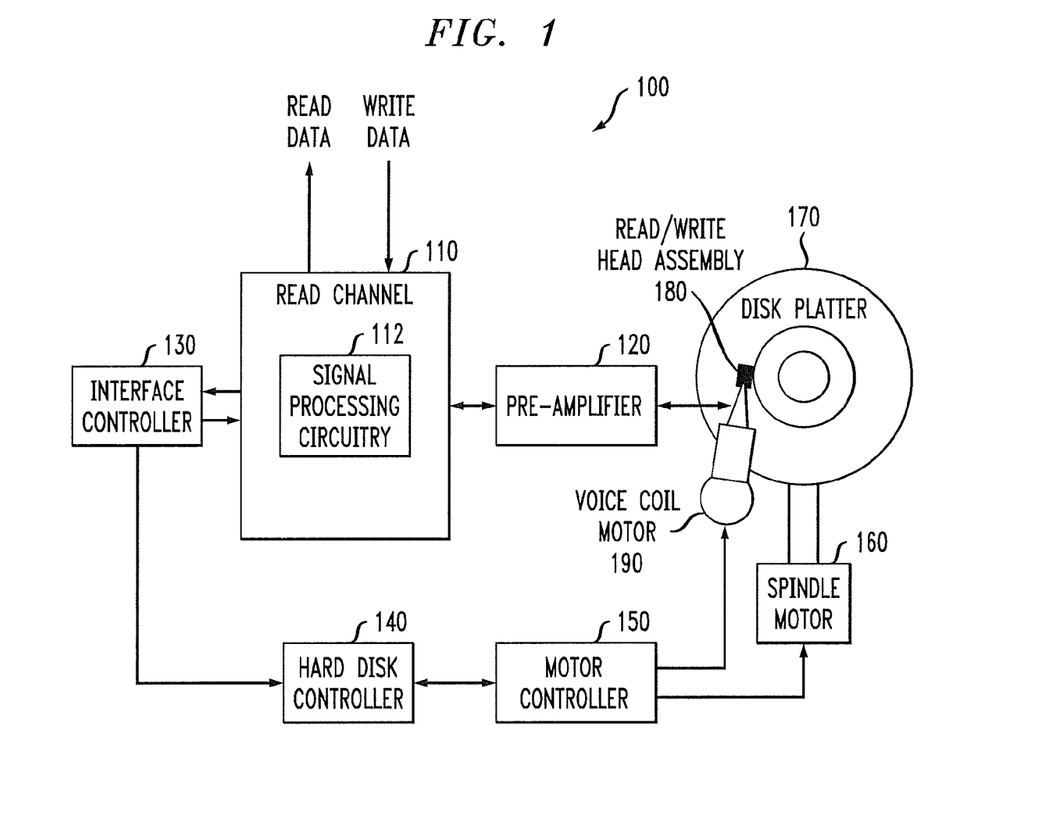
FIG. 1 shows a disk-based storage device, according to an embodiment of the invention.

FIG. 1 shows a disk-based storage device 100 including read channel circuitry 110 having signal processing circuitry 112 in accordance with various embodiments of the invention. Although shown in FIG. 1 as being incorporated within read channel circuitry 110, the signal processing circuitry 112 may also be implemented at least in part externally to the read channel circuitry 110. Storage device 100 may be, for example, a hard disk drive. Storage device 100 also includes a preamplifier 120, an interface controller 130, a hard disk controller 140, a motor controller 150, a spindle motor 160, a disk platter 170, read/write head assembly 180, and voice coil motor 190. Interface controller 130 controls addressing and timing of data to and from disk platter 170. In some embodiments, disk platter 170 includes magnetic signals recorded in accordance with either a longitudinal or a perpendicular recording scheme. The read/write head assembly 180 may comprise separate read and write heads or a single combined read/write head.

Read/write head assembly 180 is positioned by voice coil motor 190 over a desired data track on disk platter 170. Motor controller 150 controls the voice coil motor 190 to position read/write head assembly 180 in relation to disk platter 170 and drives spindle motor 160 by moving read/write head assembly to the proper data track on disk platter 170 under direction of the hard disk controller 140. Spindle motor 160 spins disk platter 170 at a determined spin rate in revolutions per minute (RPM).

Once read/write head assembly 180 is positioned adjacent the proper data track, magnetic signals representing data on disk platter 170 are sensed by read/write head assembly 180 as disk platter 170 is rotated by spindle motor 160. The sensed magnetic signals are provided as an analog signal representative of the magnetic data on disk platter 170. This analog signal is transferred from read/write head assembly 180 to read channel circuitry 110 via preamplifier 120. Preamplifier 120 is operable to amplify the analog signals accessed from disk platter 170. In turn, read channel circuitry 110 decodes and digitizes the received analog signal to recreate the information originally written to disk platter 170. This data is provided as read data.

Various elements of the storage device 100 may be implemented at least in part within a processing device. A processing device includes a processor and a memory, and may be implemented at least in part within an associated host computer or server in which the storage device 100 is installed.

Portions of the processing device may be viewed as comprising "control circuitry" as that term is broadly defined herein.

It is important to note that storage device 100 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

Embodiments of the invention utilize a fixed-point to floating-point optimization scheme with index and/or pattern-dependent quantization in order to reduce a performance loss between fixed-point and floating-point implementations of various elements in the signal processing circuitry 112, such as detectors and decoders. The flow of a read channel data signal in read channel circuitry 110 is a multi-stage process comprising: (1) a floating-point system design and optimization stage; and (2) a fixed-point implementation and optimization stage. In the design of stage (1), the focus is on development of better modulation and/or error correcting codes as well as better detection and/or decoding algorithms. In the design of stage (2), the focus is on reducing the performance loss between fixed-point and floating-point implementations. Stage (2) seeks to select the quantization levels such that each bit in the read data carries as much information as possible.

There are several techniques which may be used for selection of quantization levels. For example, the quantization levels may be chosen so as to maximize the mutual information of the quantization channel or to minimize the energy of quantization errors. One skilled in the art will readily appreciate that various other techniques may be used.

Figure 2:
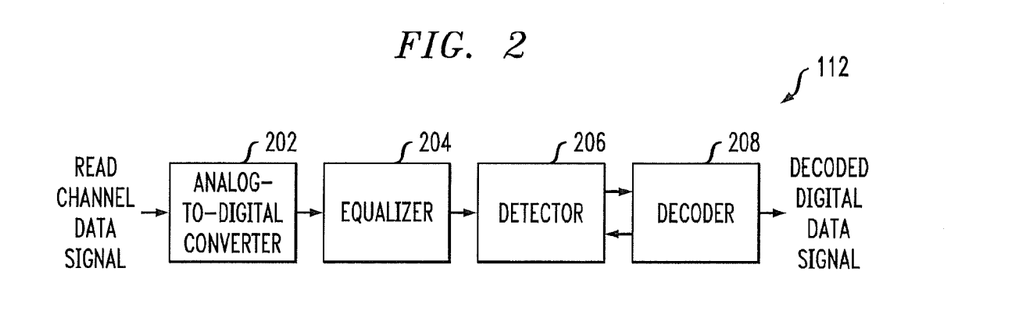
FIG. 2 is a detailed view of portions of the signal processing circuitry of FIG. 1, according to an embodiment of the invention.

FIG. 2 shows an example of portions of the signal processing circuitry 112 shown in FIG. 1. It is important to note, however, that various elements in FIG. 2 may also be implemented outside the read channel circuitry 110. An analog-to-digital converter (ADC) 202 receives a read channel data signal, which is an analog signal, and converts the analog signal into a digital data signal. The digital data signal may comprise a number of samples, referred to herein as y-samples. The ADC 202 may receive the analog signal after some portion of read channel processing has been performed on the analog signal.

The equalizer 204 in FIG. 2 receives the digital data signal from the ADC 202. In some embodiments, the equalizer 204 comprises one or more digital finite impulse response (DFIR) filters and other circuitry used to equalize a digital signal comprising a number of samples received from the analog-to-digital converter 202.

An output of the equalizer 204 is coupled to an input of the detector 206. The detector 206 may comprise a set of noise predictive finite impulse response (NPFIR) filters. As will be appreciated by one skilled in the art, various numbers and other types of filters may be used. For example, the first detector may include any number of NPFIR filters as desired.

In some embodiments, the detector 206 comprises a soft-output Viterbi algorithm (SOVA) detector which includes a number of NPFIR filters. In other embodiments, the first detector 206 comprises a maximum a posteriori probability (MAP) detector or a combination of SOVA and MAP detectors. The detector 206 receives the y-samples and is configured to determine a set of soft outputs, hard decision information and reliability information for each of the samples.

The reliability information may comprise log likelihood ratio (LLR) information. The LLR information may comprise LLR=[LLR0, LLR1, LLR2, LLR3], with each $LLR_i$ having four bits. The LLR distribution is collected over LLR0, LLR1, LLR2 and LLR3. Using a uniform quantization scheme, the quantization levels may be [−30, −28, ..., 0]. The gap, however, between floating-point and fixed-point performance can still be large, i.e., 0.1 dB to 0.2 dB depending on the channel conditions of storage device 100. While not explicitly shown in FIG. 2, the signal processing circuitry 112 may comprise a buffer coupled between the detector 206 and the decoder 208. The buffer may store the LLR distribution information determined in the detector 206. By exploring the statistics of the conditional distributions, embodiments of the invention improve the selection of quantization levels. For example, for a given acceptable sector failure rate (SFR) in the detection and decoding of the read data, embodiments can reduce the size of the buffer. Alternatively or additionally, SFR performance may increase for a given buffer size.

The decoder 208 is coupled to the detector 206. The decoder 208 is configured to decode the digital data signal based at least in part on the hard decision information and reliability information determined by the detector 206. The decoder 208 may decode the digital data signal by performing a number of local iterations. In some embodiments, the detector 206 and the decoder 208 will exchange information and perform a global iterative decoding process. The decoder 208 will output a decoded digital data signal. The decoder 208 may be a variety of different decoder types such as, for example, a low-density parity check (LDPC) decoder, a Reed Solomon (RS) decoder, or some combination of LDPC, RS and other decoder types.

The decoded digital data signal determined by the decoder 208 may comprise hard decision information, non-return to zero (NRZ) data, or other information. The decoder 208 is configured to determine a LLR distribution of the hard decision information. Similar to the detector 206, the LLR distribution may comprise LLR=[LLR0, LLR1, LLR2, LLR3], with each $LLR_i$ having four bits.

Figure 3:
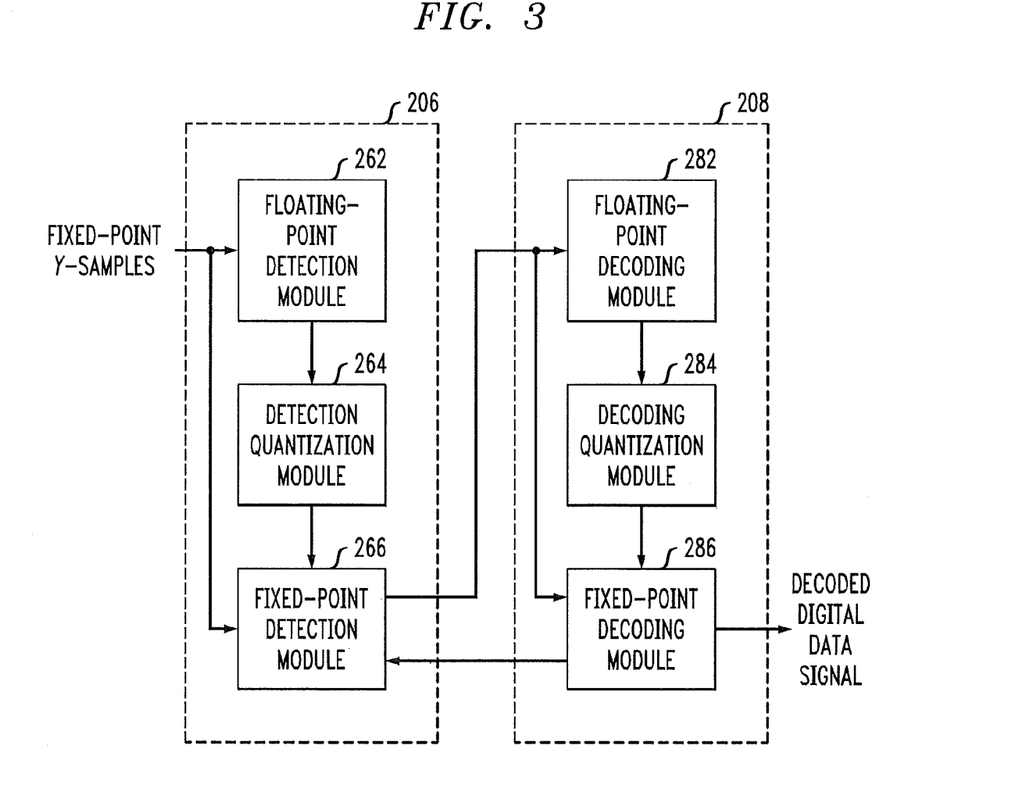
FIG. 3 is a detailed view of portions of the signal processing circuitry of FIG. 2, according to an embodiment of the invention.

FIG. 3 shows a more detailed view of portions of the signal processing circuitry 112 as shown in FIG. 2. The detector 206 in FIG. 3 comprises a floating-point detection module 262, a detection quantization module 264 and a fixed-point detection module 266. The decoder 208 comprises a floating-point decoding module 282, a decoding quantization module 284 and a fixed-point decoding module 286.

The detector 206 receives fixed-point y-samples, which are an example of a digital data signal as described above. The fixed-point y-samples are input to the floating-point detection module 262 and the fixed-point detection module 266. The floating-point detection module 262 performs floating-point detection on the fixed-point y-samples to obtain a conditional distribution of reliability information. The conditional distribution of reliability information may comprise a LLR distribution. The detection quantization module 264 collects the conditional distribution at the floating-point detection module 262 output and determines a set of detector quantization levels based on the collected conditional distribution. The set of detector quantization levels are input to the fixed-point detection module 266. Using the set of detector quantization levels, the fixed-point detection module 266 performs fixed-point detection on the fixed-point y-samples.

An output of the fixed-point detection module 266 is input to the decoder 208. The floating-point decoding module 282 and the fixed-point decoding module 286 each receive the output of the fixed-point detection module 266. The floating-point decoding module 282 obtains a conditional distribution of hard decision information from the fixed-point detection output using floating-point decoding. The conditional distribution may comprise a LLR distribution. The floating-point decoding module 282 may scale the fixed-point detection output to a full precision before obtaining the conditional distribution of hard decision information.

The decoding quantization module 284 collects the conditional distribution of hard decision information from an output of the floating-point decoding module 282 and determines a set of decoder quantization levels based on the conditional distribution of hard decision information. The set of decoder quantization levels are input to the fixed-point decoding module 286. The fixed-point decoding module 286 decodes the fixed-point detection output using the decoder quantization levels to determine the decoded digital signal. The fixed-point decoding module 286 and the fixed-point detection module 266 may perform a number of global iterations on a given input of fixed-point y-samples to determine the decoded digital data signal.

As described above, the conditional distributions of reliability information and hard decision information obtained in the floating-point detection module 262 and the floating-point decoding module 282, respectively, may comprise LLR distributions. In embodiments of the invention, the conditional distributions may be dependent on the index of the reliability information obtained in the floating-point detection module 262 or the hard decision information obtained by the floating-point decoding module 282. For example, if the conditional distributions comprise LLR distributions such that LLR=[LLR0, LLR1, LLR2, LLR3], with each $LLR_i$ having four bits, the conditional distributions may be determined for each index $LLR_i$. Each index LLRi may correspond to a given reliability indicator or hard decision in the set [00, 01, 10, 11].

The conditional distributions of reliability information and hard decision information obtained in the floating-point detection module 262 and the floating-point decoding module 282 may be alternatively or further dependent on the pattern of data in the fixed-point y-samples. Thus, the detector and decoder quantization levels may be determined for each pattern of data in the fixed-point y-samples and/or each index of the conditional distributions.

In some embodiments, the conditional distributions are not dependent on the acceptable or desired SFR. In other words, the conditional distributions do not vary much with SFR. Thus, the quantization levels determined for a given acceptable SFR or signal-to-noise ratio (SNR) condition may be used for various other SFR or SNR conditions. In other embodiments, wherein concerns regarding accuracy outweigh concerns relating to processing speed, the quantization levels may be further dependent on the given acceptable or desire SFR or further dependent on a SNR condition of the digital data signal.

As discussed above, the detector 206 and the decoder 208 may perform a number of global iterations for a given digital data signal. However, the conditional distributions of the reliability information and hard decision information determined by the floating-point detection module 262 and the floating-point decoding module 282, respectively, do not vary much from global iteration to global iteration. Thus, in some embodiments the processing in the floating-point detection module 262, detection quantization module 264, floating-point decoding module 282 and decoding quantization module 284 are performed only for a first one of the global iterations for a given digital data signal. In other embodiments, the processing in the floating-point detection module 262, detection quantization module 264, floating-point decoding module 282 and decoding quantization module 284 are performed once for every x iterations, where x≥2. Again, in embodiments wherein concerns regarding accuracy outweigh concerns relating to processing speed, the processing in floating-point detection module 262, detection quantization module 264, floating-point decoding module 282 and decoding quantization module 284 may be performed for each global iteration.

Embodiments of the invention may advantageously provide for better performance in fixed-point detection and fixed-point decoding. In using conditional distributions, which may be dependent on the pattern of data in the digital data signal and/or the index of the reliability and hard decision information determined by the floating-point detection module 262 and the floating-point decoding module 282, respectively, the sets of detector and decoder quantization levels determined in the detection quantization module 264 and the decoding quantization module 284 are improved. Schemes in which uniformly spaced quantization levels are used may ignore variations in the heavy tail of LLR distributions, which degrade performance. Embodiments of the invention, however, utilize conditional LLR distributions over the entire range, thus taking into account variation and characteristics of the heavy tail.

In addition, the conditional distributions can have very different shapes and/or support ranges depending on the index. As such, in embodiments of the invention the detector and decoder quantization levels may have non-uniformly spaced quantization levels. If the conditional distribution comprises a LLR distribution LLR=[LLR0, LLR1, LLR2, LLR3], with each $LLR_i$ having four bits, the spacing of quantization levels across the indexes may vary and may additionally vary within an index. As an example, LLR0 may comprise four uniformly spaced bits such that LLR0=[−36, −32, −28, −24] while LLR1 may comprise four uniformly spaced bits such that LLR1=[−22, −20, −18, −16]. Thus, the spacing is uniform for each index, but not uniform across the indexes LLR0 and LLR1. As another example, LLR0 may comprise four non-uniformly spaced bits such that LLR0=[−36, −30, −28, −24]. Thus, the spacing within the index LLR0 is not uniform. It is important to note that various other configurations may be used, and that the particular values of bits in the conditional distributions will vary depending on the read channel data signal.

A variety of techniques may be used to determine the detector and decoder quantization levels in the detection quantization module 264 and the decoding quantization module 284, respectively. For example, an entropy-based method may be used to determine the quantization levels from the conditional distributions. As another example, a threshold probability-based method may be used. As discussed above, approaches which maximize the mutual information of a quantization channel or minimize the energy of quantization errors may also be used. One skilled in the art will readily appreciate that a variety of other techniques, including combinations of one or more of the above-described techniques, may be used in embodiments of the invention. The quantization levels are determined in a manner so as to ensure that each bit carries as much information as possible.

Figure 4:
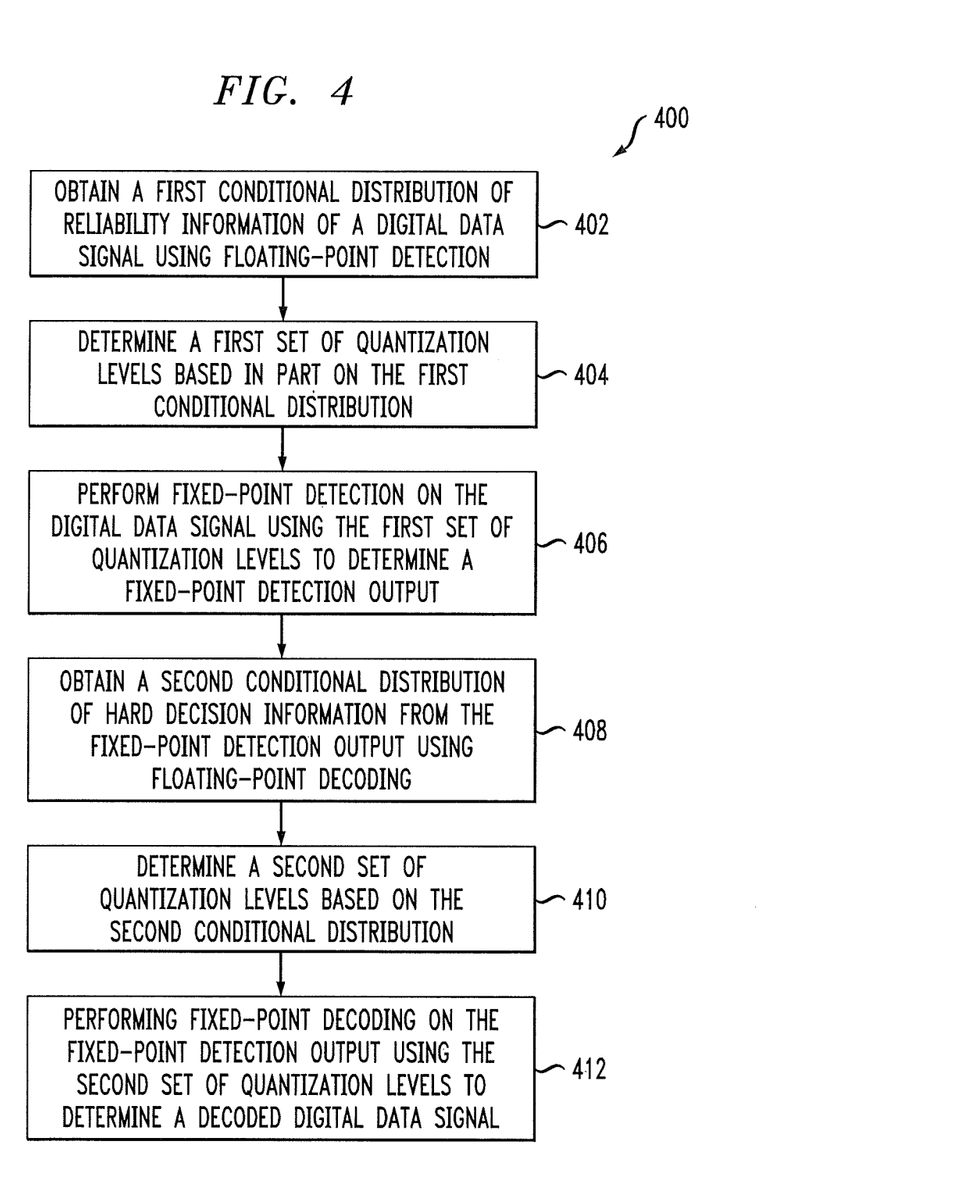
FIG. 4 is a methodology of floating-point to fixed-point optimization, according to an embodiment of the invention.

FIG. 4 illustrates a methodology 400 in accordance with an embodiment of the invention. The methodology 400 begins with step 402, obtaining a first conditional distribution of reliability information of a digital data signal using floating-point detection. Next, a first set of quantization levels are determined 404 based at least in part on the first conditional distribution. Fixed-point detection is then performed 404 on the digital data signal using the first set of quantization levels to determine a fixed-point detection output. Steps 402-406 may be performed in a detector such as detector 206 described above with reference to FIGS. 2-3.

The methodology 400 continues with step 408, obtaining a second conditional distribution of hard decision information from the fixed-point detection output using floating-point decoding. Next, a second set of quantization levels are determined 410 based at least in part on the second conditional distribution. Then, in step 412, fixed-point decoding is performed on the fixed-point detection output using the second set of quantization levels to determine a decoded digital data signal. Steps 408-412 may be performed in a decoder such as decoder 208 described above with reference to FIGS. 2-3.

Step 412 may be repeated so that the fixed-point decoding is performed for a number of local iterations on the fixed-point detection output. Steps 406 and 412 may be repeated a number of times to perform a corresponding number of global iterations for a given digital data signal. Steps 402, 404, 408 and 410 of methodology 400 may be performed only for the first one of the global iterations, or may be performed once for each x number of global iterations, where x≥2. In some cases, concerns over accuracy may outweigh concerns regarding processing speed and thus steps 402-412 of methodology 400 may performed for each global iteration for a given digital data signal.

As mentioned previously, the storage device configuration can be varied in other embodiments of the invention. For example, the storage device may comprise a hybrid HDD which includes a flash memory in addition to one or more storage disks. Also, the process or portions thereof as described above in methodology 400 may be implemented in the form of software that is stored in a memory and executed by a processor. Such a memory may be viewed as an example of what is more generally referred to as a computer-readable storage medium comprising executable program code.

In addition, storage device 100 may be coupled to or incorporated within a host processing device, which may be a computer, server, communication device, etc.

Figure 5:
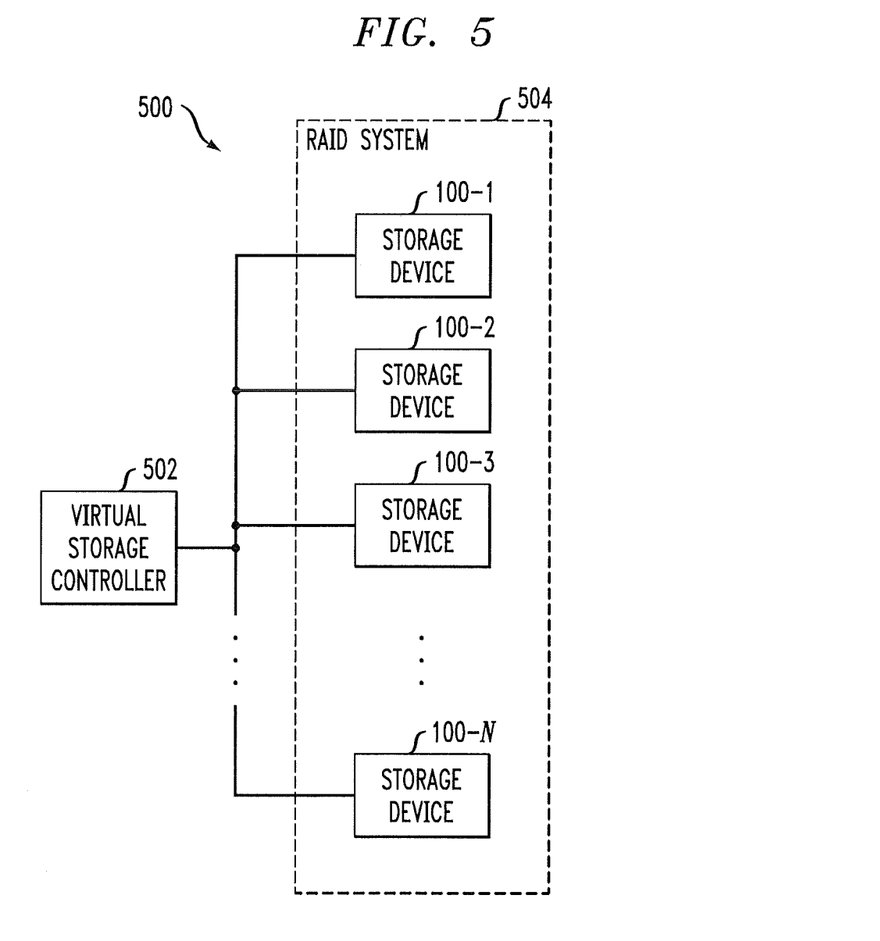
FIG. 5 shows a virtual storage system incorporating a plurality of disk-based storage devices of the type shown in FIG. 1, according to an embodiment of the invention.

Multiple storage devices 100-1 through 100-N possibly of various different types may be incorporated into a virtual storage system 500 as illustrated in FIG. 5. The virtual storage system 500, also referred to as a storage virtualization system, illustratively comprises a virtual storage controller 502 coupled to a RAID system 504, where RAID denotes Redundant Array of Independent storage Devices. The RAID system more specifically comprises N distinct storage devices denoted 100-1, 100-2, . . . 100-N, one or more of which may be HDDs and one or more of which may be solid state drives. Furthermore, one or more of the HDDs of the RAID system are assumed to be configured to include read channel circuitry and associated error correction circuitry as disclosed herein. These and other virtual storage systems comprising HDDs or other storage devices are considered embodiments of the invention.

Embodiments of the invention may also be implemented in the form of integrated circuits. In a given such integrated circuit implementation, identical die are typically formed in a repeated pattern on a surface of a semiconductor wafer. Each die includes, for example, at least a portion of signal processing circuitry 112 as described herein, and may further include other structures or circuits. The individual die are cut or diced from the wafer, then packaged as an integrated circuit. One skilled in the art would know how to dice wafers and package die to produce integrated circuits. Integrated circuits so manufactured are considered embodiments of the invention.

It should again be emphasized that the above-described embodiments of the invention are intended to be illustrative only. For example, other embodiments can use different types and arrangements of storage disks, read/write heads, read channel circuitry, signal processing circuitry, decoders, filters, detectors, and other storage device elements for implementing the described functionality. Also, the particular manner in which certain steps are performed in the signal processing may vary. Further, although embodiments of the invention have been described with respect to storage disks such as HDDs, embodiments of the invention may be implemented in various other devices including optical data-storage applications and wireless communications. These and numerous other alternative embodiments within the scope of the following claims will be apparent to those skilled in the art.

What is claimed is:

1. An apparatus, comprising:

read channel circuitry; and signal processing circuitry associated with the read channel circuitry, the signal processing circuitry comprising:

a detector, the detector being configured to perform floating-point detection on a digital data signal, to determine a first set of quantization levels based at least in part on a result of the floating-point detection, and to perform fixed-point detection on the digital data signal using the first set of quantization levels; and a decoder coupled to the detector, the decoder being configured to perform floating-point decoding on an output of the detector, to determine a second set of quantization levels based at least in part on a result of the floating-point decoding, and to perform fixed-point decoding on the output of the detector using the second set of quantization levels.

2. The apparatus of claim 1, wherein:

the detector is further configured:

to obtain a first conditional distribution of reliability information of the digital data signal using the floating-point detection;

to determine the first set of quantization levels based on the first conditional distribution; and to perform fixed-point detection on the digital data signal using the first set of quantization levels to determine a fixed-point detection output; and the decoder is further configured:

to obtain a second conditional distribution of hard decision information from the fixed-point detection output using floating-point decoding;

to determine the second set of quantization levels based on the second conditional distribution; and to perform fixed-point decoding on the fixed-point detection output using the second set of quantization levels to determine a decoded digital data signal.

3. The apparatus of claim 2, wherein the first conditional distribution comprises a log likelihood ratio distribution.

4. The apparatus of claim 3, wherein the log likelihood ratio distribution comprises log likelihood ratio information dependent on an index of reliability information determined using floating-point detection.

5. The apparatus of claim 4, wherein the first set of quantization levels is determined for each index of the reliability information.

6. The apparatus of claim 3, wherein the log likelihood ratio distribution comprises log likelihood ratio information dependent on a pattern of data in the digital data signal.

7. The apparatus of claim 6, wherein the first set of quantization levels is determined for each pattern of data in the digital data signal.

8. The apparatus of claim 2, wherein the first set of quantization levels is determined for each combination of: an index of reliability information determined using floating-point detection; and a pattern of data in the digital data signal.

9. The apparatus of claim 2, wherein obtaining the second conditional distribution of reliability information further comprises scaling the fixed-point detection output to a full precision.

10. The apparatus of claim 2, wherein the signal processing circuitry is configured to perform a number of global iterations for the digital data signal and wherein the signal processing circuitry is configured to perform fixed-point detection and to perform fixed-point decoding for each of the number of global iterations.

11. The apparatus of claim 10, wherein the signal processing circuitry is configured to obtain the first conditional distribution, to determine the first set of quantization levels, to obtain the second conditional distribution and to determine the second set of quantization levels only for a first one of the number of global iterations.

12. The apparatus of claim 10, wherein the signal processing circuitry is configured to obtain the first conditional distribution, to determine the first set of quantization levels, to obtain the second conditional distribution and to determine the second set of quantization levels for a first one of the number of global iterations and every x-th global iteration following the first one of the number of global iterations, where $x \geq 2$.

13. The apparatus of claim 2, wherein the first set of quantization levels is independent of a signal-to-noise ratio of the digital data signal.

14. The apparatus of claim 2, wherein at least one of the first set of quantization levels and the second set of quantization levels is a non-uniformly spaced set of quantization levels.

15. The apparatus of claim 1 wherein the read channel circuitry and associated signal processing circuitry are fabricated in at least one integrated circuit.

16. A storage device comprising:
   at least one storage medium;
   a read head configured to read data from the storage medium; and
   control circuitry coupled to the read head and configured to process data received from the read head;
   the control circuitry comprising the apparatus of claim 1.

17. A virtual storage system comprising the storage device of claim 16.

18. A method comprising the steps of:
   performing floating-point detection on a digital data signal in a detector;
   determining a first set of quantization levels in the detector based at least in part on a result of the floating-point detection;
   performing fixed-point detection on the digital data signal in the detector using the first set of quantization levels;
   performing floating-point decoding on an output of the detector in a decoder;
   determining a second set of quantization levels in the decoder based at least in part on a result of the floating-point decoding; and
   performing fixed-point decoding on the output of the detector in the decoder using the second set of quantization levels.

19. The method of claim 18, wherein:
the step of performing fixed-point detection further comprises:
   obtaining a first conditional distribution of reliability information of the digital data signal using floating-point detection;
   determining the first set of quantization levels based on the first conditional distribution; and
   performing fixed-point detection on the digital data signal using the first set of quantization levels to determine a fixed-point detection output; and
the step of performing fixed-point decoding further comprises:
   obtaining a second conditional distribution of hard decision information from the fixed-point detection output using floating-point decoding;
   determining the second set of quantization levels based on the second conditional distribution; and
   performing fixed-point decoding on the fixed-point detection output using the second set of quantization levels to determine a decoded digital data signal.

20. An apparatus comprising:
   a detector comprising a floating-point detection module, a detection quantization module and a fixed-point detection module, wherein the fixed-point detection module performs fixed-point detection based at least in part on a first set of quantization levels determined in the detection quantization module, the detector quantization levels being determined based on an output of the floating-point detection module; and
   a decoder comprising a floating-point decoding module, a decoding quantization module and a fixed-point decoding module, wherein the fixed-point decoding module performs fixed-point decoding based at least in part on a second set of quantization levels determined in the decoding quantization module, the decoder quantization levels being determined based on an output of the floating-point decoding module.

* * * * *

UNITED STATES PATENT AND TRADEMARK OFFICE
CERTIFICATE OF CORRECTION

| | |
|---|---|
| PATENT NO. | : 8,743,493 B1 |
| APPLICATION NO. | : 13/742753 |
| DATED | : June 3, 2014 |
| INVENTOR(S) | : Wu Chang et al. |

Page 1 of 1

It is certified that error appears in the above-identified patent and that said Letters Patent is hereby corrected as shown below:

In the specification:

Column 5, line 51, please change "desire" to --desired--

Column 6, line 65, after "performed" please change "404" to --406--

Signed and Sealed this
Thirtieth Day of September, 2014

Michelle K. Lee
*Deputy Director of the United States Patent and Trademark Office*